United States Patent [19]

Billings et al.

[11] Patent Number: 5,087,043
[45] Date of Patent: Feb. 11, 1992

[54] INTERACTIVE AUDIO-VISUAL PUZZLE

[75] Inventors: Zeb Billings, Hartland, Wis.; Harold D. Pierce, Woodland Hills, Calif.; Conrad W. Kish, Brookfield; Patrick E. Kusina, Greenfield, both of Wis.

[73] Assignee: Sight and Sound Inc., New Berlin, Wis.

[21] Appl. No.: 478,086

[22] Filed: Feb. 9, 1990

[51] Int. Cl.⁵ ............................ A63F 9/10; G09B 7/06
[52] U.S. Cl. ................................. 273/157 R; 434/327; 434/333; 434/339; 434/348
[58] Field of Search ............... 273/138 A, 153 R, 156, 273/157 R, 1 E, 237; 434/327, 333, 339, 340, 346, 348, 317, 356

[56] References Cited

U.S. PATENT DOCUMENTS

| | | | |
|---|---|---|---|
| 3,015,895 | 1/1962 | Stall | 434/340 |
| 3,641,684 | 2/1972 | Paige | 35/8 A |
| 3,702,032 | 11/1972 | Doring | 35/8 A |
| 3,738,021 | 6/1973 | Hino et al. | 35/8 A |
| 3,744,150 | 7/1973 | Folson | 35/8 A |
| 4,002,355 | 1/1977 | Sendor | 281/29 |
| 4,228,596 | 10/1980 | Daniel | 273/237 |
| 4,273,538 | 6/1982 | Ross | 434/178 |
| 4,337,375 | 6/1982 | Freeman | 179/5 A |
| 4,348,191 | 9/1982 | Lipsitz et al. | 434/308 |
| 4,358,278 | 11/1982 | Goldfarb | 434/337 |
| 4,403,965 | 9/1983 | Hawkins | 434/327 |
| 4,411,628 | 10/1983 | Laughon et al. | 434/169 |
| 4,423,290 | 12/1983 | Yoshida et al. | 381/51 |
| 4,425,098 | 1/1984 | Doring | 434/317 |
| 4,466,801 | 8/1984 | Dittakavi et al. | 434/335 |
| 4,487,585 | 12/1984 | Goldwasser | 273/156 X |
| 4,516,260 | 5/1985 | Breedlove et al. | 434/169 X |
| 4,547,630 | 10/1985 | Giammarrusco | 179/89 |
| 4,564,954 | 1/1986 | Nittaya et al. | 381/51 |
| 4,636,881 | 1/1987 | Brefka et al. | 360/74.1 |
| 4,703,573 | 11/1987 | Montgomery et al. | 40/455 |
| 4,752,230 | 6/1988 | Shimizu | 434/317 |
| 4,765,623 | 8/1988 | Cardillo et al. | 273/161 |
| 4,778,391 | 10/1988 | Weiner | 434/317 |
| 4,893,817 | 1/1990 | Shilo | 273/157 R |

FOREIGN PATENT DOCUMENTS 60-39878 11/1985 Japan.

OTHER PUBLICATIONS

The ESS Sound Magician Users Manual (Version 3.1—ES3000).

Primary Examiner—Edward M. Coven
Assistant Examiner—William M. Pierce
Attorney, Agent, or Firm—Amster, Rothstein & Ebenstein

[57] ABSTRACT

An audio-visual interactive puzzle includes a rigid puzzle form defining a predetermined number of form cutouts, an upper graphic disposed on the form upper surface, and a plurality of respective removable puzzle pieces, each having a peripheral configuration conforming to that of an associated form cutout and bearing a piece graphic. A flexible membrane bears on the underside thereof a plurality of conductors in predetermined relative disposition, and a plurality of respective lower graphics overlie the flexible membrane and underlie the form cutouts. A spacer includes respective spacer cutouts generally corresponding to and disposed to underlie the form cutouts, and a conductive ground plane underlies the spacer cutouts. An electronic sound generator generates respective predetermined associated sounds in response to the input signals applied thereto. The flexible membrane conductors, spacer and ground plane cooperate to form a touchpad including a touchpoint corresponding to each of the lower graphics electrically connected to the sound generator, thereby to selectively effect generation of the input signals to the sound generator.

8 Claims, 12 Drawing Sheets

INTERACTIVE AUDIO-VISUAL PUZZLE

BACKGROUND OF THE INVENTION

1. Field of the Invention

The present invention relates, generally, to interactive electronic amusement devices, and more particularly, to an Interactive Audio-Visual puzzle.

2. Description of the Prior Art

In general, educational puzzles for young (e.g., pre-school) children are known. In some such puzzles, a puzzle piece is removed from a frame to reveal an underlying picture. Examples of such puzzles are the "Pick-Up & Peek" puzzle, produced by Fisher-Price, and the Playskool "Lift & Look" puzzle. Puzzles which produce some manner of sounds are also known. An example is the "Melody Puzzle", by Connor Toys.

Interactive amusement devices (e.g., toys) which produce sound are also, in general, known. Examples of such toys are described in U.S. Pat. No. 4,516,620 issued to Breedlove on May 7, 1985 and in U.S. Pat. No. 4,706,536 issued to Sanders on Nov. 17, 1987. Many such toys, however, fail to provide sufficient visual interaction to stimulate a pre-school child's imagination, and tend to have little utility if the audio portion becomes inoperable. Furthermore, such devices often either provide little opportunity for the improvement of a child's manual dexterity, or require spelling, reading, or highly developed fine motor skills not typically possessed by young children.

Accordingly, there is a need for an electronic amusement device that provides high quality audio and visual stimulation to a young child while tending to develop the child's fine motor skills. Preferably, the device would, to some extent, be educational, yet maintain a young child's interest and be suitable for use by the child, even if batteries become exhausted. It is also desirable that the toy provide high sound quality, while maintaining a suitable enclosure profile and include an energy saving mechanism to prevent rapid discharge of batteries.

SUMMARY OF THE INVENTION

The present invention provides an audio-visual interactive puzzle comprising a background, puzzle pieces, and an electronic unit disposed on a substrate. The electronic unit selectively generates one of a plurality of sounds as a prompt corresponding to a puzzle piece according to a sequence, or in response to input signals provided by the user actuating one of a plurality of selectively actuable switches maintained on the substrate and located beneath puzzle pieces. The prompt sequence is such that a prompt is provided for each puzzle piece once before prompting any puzzle piece a second time.

BRIEF DESCRIPTION OF THE DRAWING

A preferred exemplary embodiment will hereinafter be described in conjunction with the appended drawing, wherein like elements are denoted with like designations, and.

DETAILED DESCRIPTION OF THE PREFERRED EXEMPLARY EMBODIMENT

Figure 1A:
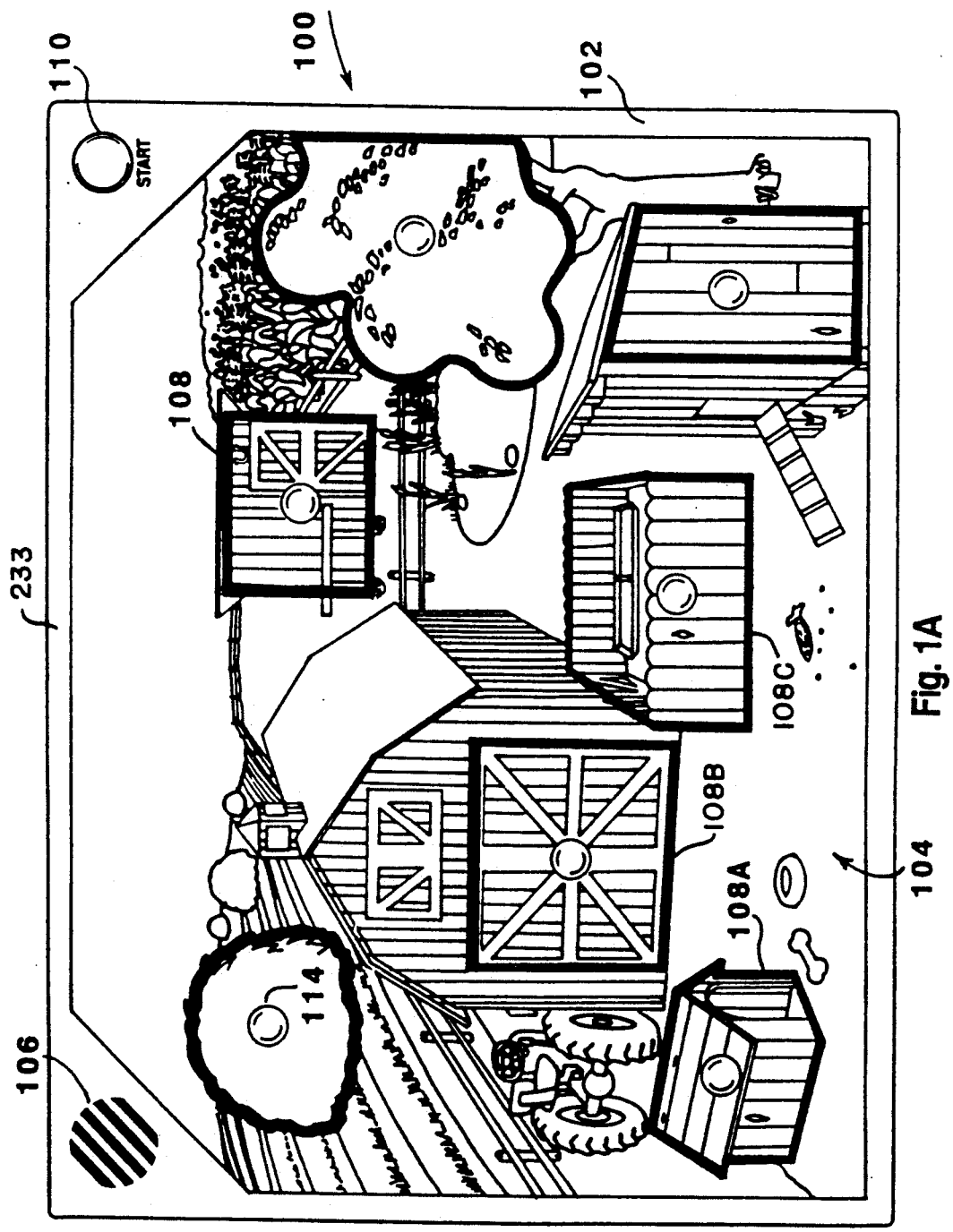
FIG. 1A is a top plan view of the preferred exemplary embodiment.
Figure 1B:
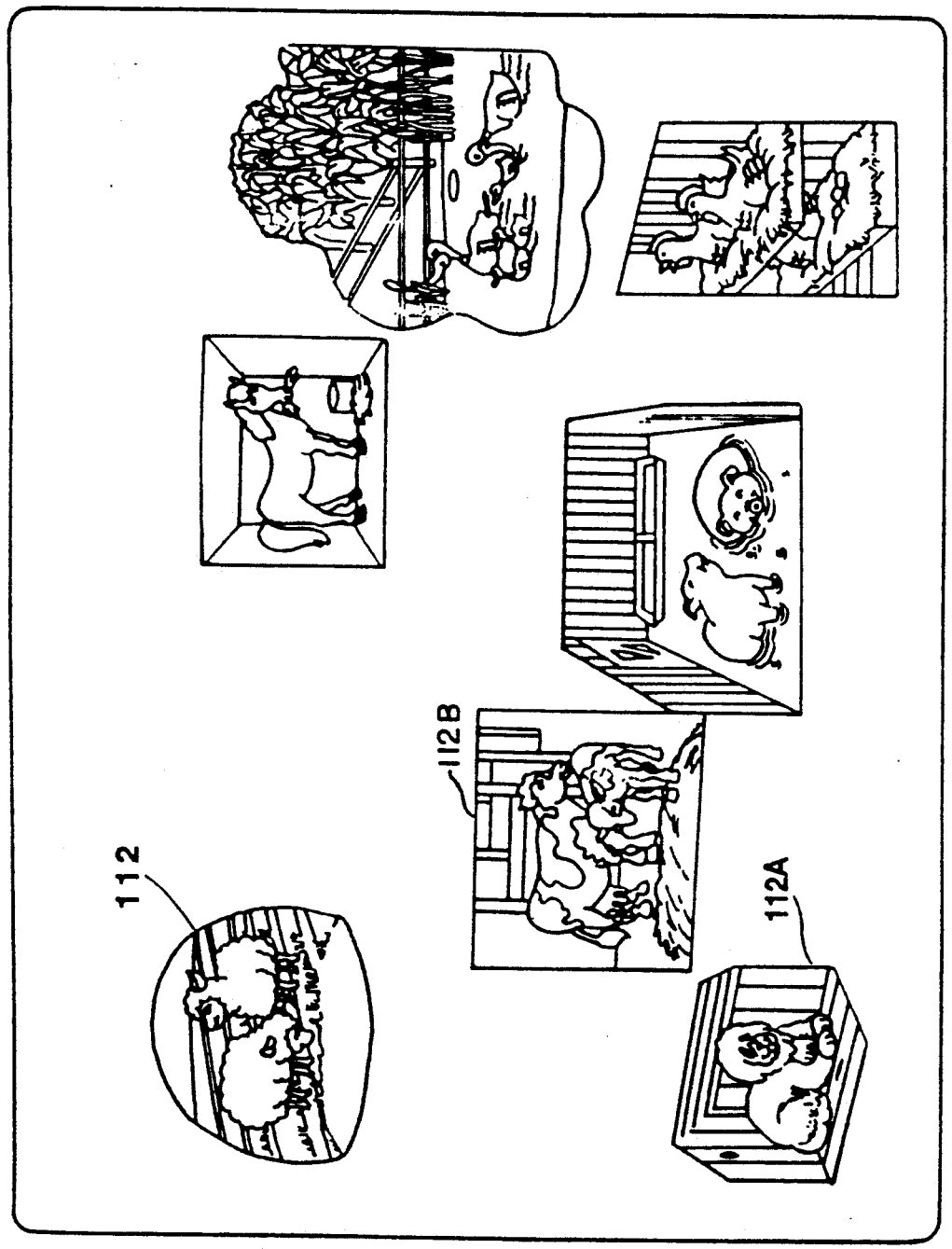
FIG. 1B is a top view of exemplary graphics located under the puzzle pieces.

Referring to FIGS. 1A, 1B, 1C, 1D and 2A, an audio-visual interactive puzzle 100 in accordance with the present invention, suitably comprises an upper case a start button 110; a rigid puzzle form 226, including a predetermined number, e.g., seven, of cutouts 234A, 234B, etc. (collectively referred to as cutouts 234); an upper graphic, such as a background scene 104 provided on the upper surface of form 226; a plurality of respective removable puzzle pieces 108A, 108B, etc. (collectively referred to as puzzle pieces 108), each having a peripheral configuration conforming to that of an associated cutout 234 and bearing a graphic related to background scene 104; a flexible sheet 228 bearing a plurality of respective lower graphics 112A, 112B etc. (collectively referred to as graphics 112), each disposed to underlie an associated cutout 234; a flexible membrane 204 bearing, on the underside thereof, a plurality of respective conductors 401–406; a spacer 206 including respective spacer cutouts 236A, 236B, etc. (collectively referred to as cutouts 236) generally corresponding to, and disposed to underlie, cutouts 234 of puzzle form 226 and start button 110; a conductive sheet (ground plane) 208 disposed on a backboard 252; a lower case 210; an electronic unit 216; and a speaker 202.

In general, the subject matter of the graphics on puzzle pieces 108, and of the corresponding underlying graphic 112, preferably bear a logical relationship to background scene 104 in general, and to each other in particular. With puzzle pieces 108 disposed in cutouts 234, puzzle pieces 108 and puzzle form 226 cooperate to portray background scene 104 in a first aspect. When a given puzzle piece 108 is removed from the corresponding cutout 234, the corresponding underlying graphic 112 is exposed to portray a second related aspect of background scene 104. For example, background scene 104 may depict a farm, and pieces 108A, 108B and 108C a dog house, a barn door, and a pig pen, respectively. Underlying graphics 112A, 112B and 112C may then depict a dog in the interior of the dog house, cows in the interior of the barn, and pigs in the interior of the pig pen, respectively.

As will hereinafter be explained, membrane 204 (and more particularly conductors 402–406 on the underside thereof), spacer 206 and ground plane 208 cooperate to form a touchpad (switch matrix), including a touchpoint (switch) corresponding to each underlying graphic 112, and to start button 110. Electronic unit 116 cooperates with speaker 202 to generate, suitably from prestored digital representations, predetermined sounds and speech in response to input signals applied thereto from the touchpad.

In general, a child initiates a play sequence by depressing start button 110, causing electronic unit 116 and speaker 202 to pseudo randomly generate an audio prompt related to the subject matter of one of graphics 112A, e.g., audibly generate the words "Find and touch the cow". The user would then remove the puzzle piece related to the indicated graphic, e.g., piece 108B depicting the barn door, to expose the designated graphic 112, e.g., graphic 112B depicting the cow inside the barn, and touch graphic 112. Touching graphic 112 depresses the associated touchpoint to effect generation of a concomitant input signal to electronic unit 116. If the response corresponds to the particular graphic 112 indicated by the prompt, e.g., the user correctly exposes and touches graphic 112B depicting the cow, an audio response related to the subject matter of the selected graphic 112 is generated, suitably together with an audio reward, e.g., the mooing of a cow is replicated, followed by a congratulatory remark. Thereafter, a further audio prompt, relating to a different graphic 112, is generated, soliciting a new response. For example, the prompt may be "Find and touch the dog", soliciting removal of puzzle piece 108A (depicting a dog house), and exposure and depression of graphic 112A (depicting the dog). The prompts are continued in a pseudo random manner, as will be explained, until the user responds incorrectly, or fails to respond within a predetermined period of time. If the user does not make the appropriate response, an audio prompt is generated requesting a further response, e.g., a rendition of the words, "Try again".

Upper case 102 and lower case 210 cooperate to maintain puzzle form 226, sheet 228, membrane 204, spacer 206 and ground plane 208, which resides on backboard 252, in their appropriate relative dispositions, and to secure speaker 202 and electronic unit 216. Upper case 102 and lower case 210 are suitably formed by injection molding of HIPS (high impact styrene) plastic. Upper case 102 suitably includes a plurality of rigid sides 232 (FIGS. 1C, 1D, 2A), an interior peripheral upper flange 233 (FIGS. 1A, 2A), a speaker grille 106 (FIGS. 1A, 2A) formed in one corner of the upper surface thereof, and a bore 230 (FIG. 2A) for start button 110.

Speaker grille 106 and bore 230 are suitably formed as part of the injection molding process used to make upper case 102. Speaker grille 106 baffles sound produced by, and provides front loading for, speaker 202. The front loading and baffling of speaker 202 facilitate production of high quality sound. Bore 230, as best seen in FIG. 3B, suitably comprises a cylindrical tube of a length approximating the length of sides 232, communicating with the upper surface of flange 233. Speaker grille 106 and receptacle 230 will be more fully described hereafter in conjunction with FIG. 3.

Figure 1C:
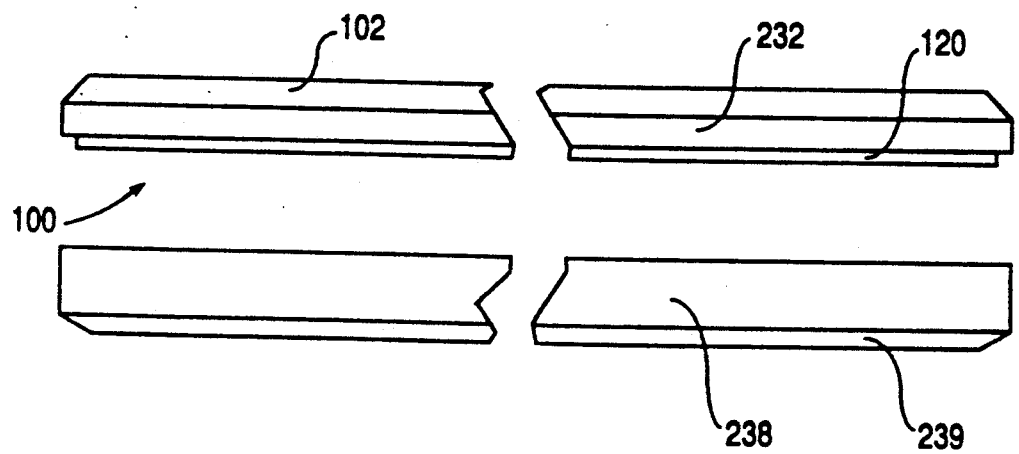
FIG. 1C is an exploded side view of the upper and lower case.
Figure 1D:
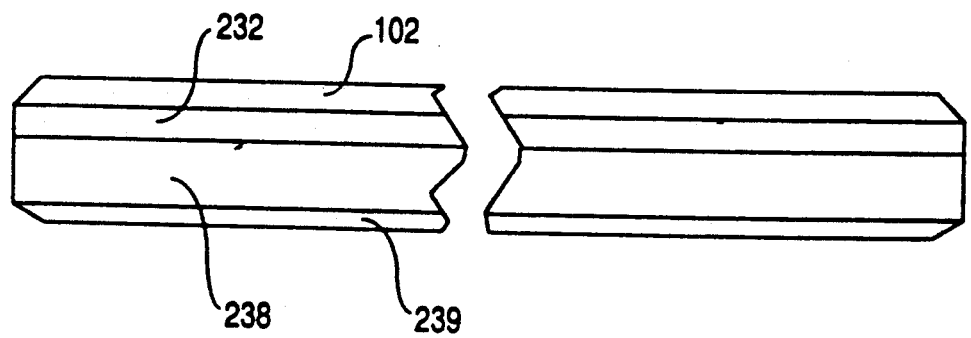
FIG. 1D is a side view of the puzzle in assembled form.
Figure 2A:
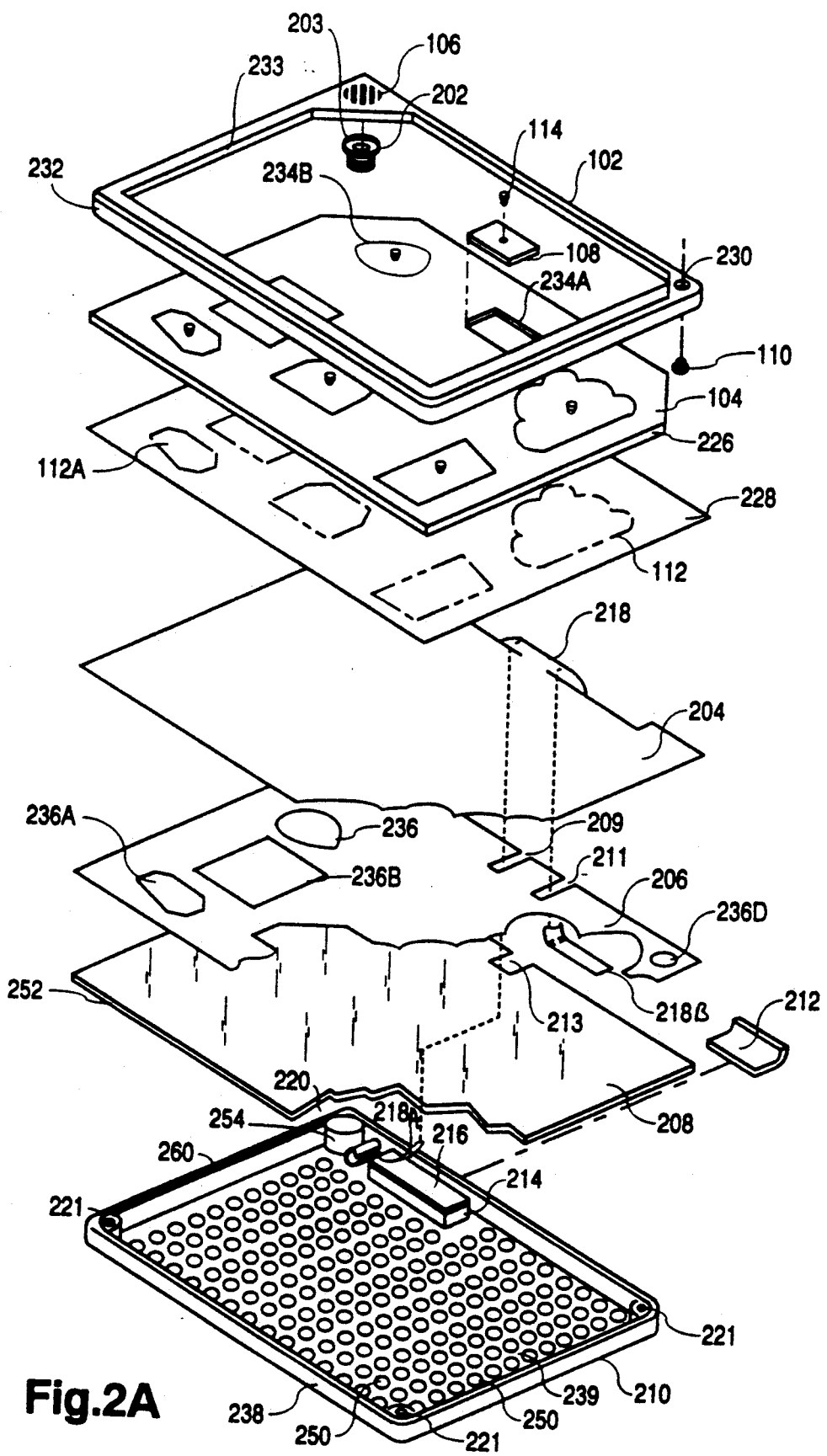
FIG. 2A is an exploded view of the interactive audio-visual puzzle.
Figure 2B:
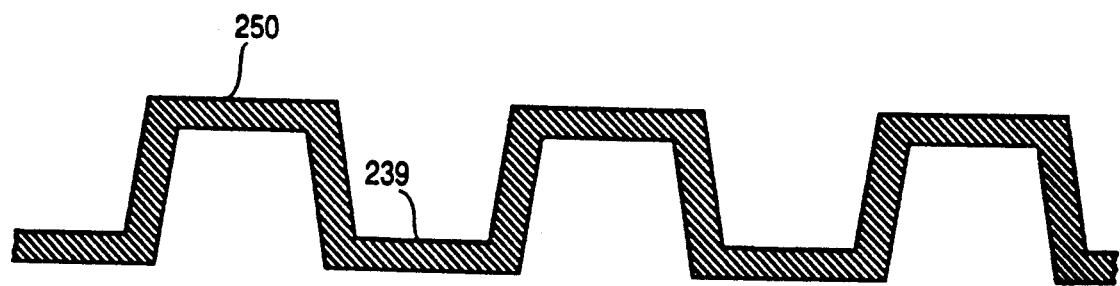
FIG. 2B is an elevational cross section of the base and spacers.
Figure 2C:
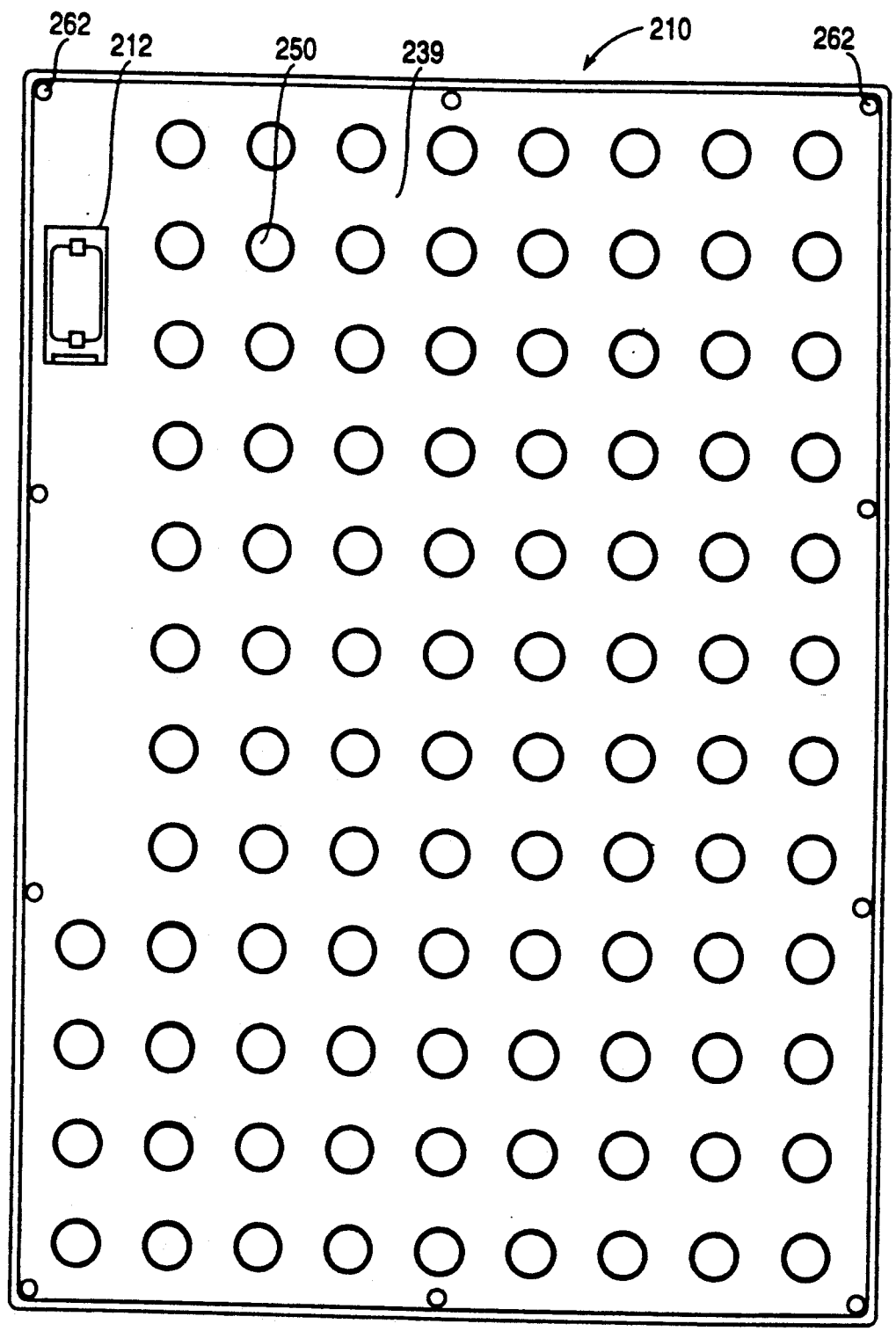
FIG. 2C is a bottom view of the puzzle.

With reference now to FIGS. 1C, 1D, 2A, 2B and 2C, lower case 210 suitably comprises rigid sides 238 having a groove 260, and a base 239, a speaker compartment 254 (FIG. 2A) for receiving and holding speaker 202, an electronic compartment 214 for receiving and securing electronic unit 216, and a plurality of spacers 250 (also called supports 250 or stanchions 250). Lower case 210 is adapted to be secured to upper case 102 by, for example, respective screws (not shown) extending through a plurality of holes 221 to engage upper case 102. A cover 212 (FIG. 2C) is provided in the vicinity of electronics compartment 214 to allow access to a plurality of batteries (542-546 of FIG. 5). If desired, a plurality of rests 262 (FIG. 2C) are provided, projecting from the underside of lower case 210. Spacers 250 support ground plane backboard 252 and provide a free air space providing baffling of speaker 202. With reference to FIGS. 2A, 2B and 2C, spacers 250, sometimes hereinafter referred to as "spacer rings 250", are preferably formed integrally with lower case 210 during molding in the form of upward protrusions of base 239. Spacers 250 are formed throughout base 239, except in the area of compartments 214 and 254.

Spacer rings 250 are preferably generally cylindrical closed top undulations in base 239, appearing from the bottom of lower case 210 (FIG. 2C), as cylindrical recesses. The nearly infinite baffling thus provided improves the sound quality of speaker 202.

Puzzle form 226 provides a substrate for background scene 104, with cutouts 234 providing receptacles for the respective puzzles pieces 108. Form 226, preferably generally rectangular in shape, is received within sidewalls 232 of frame 102 and, in assembly, abuts the underside of flange 233. Form 226 is suitably formed of a rigid material, preferably injection molded from HIPS plastic, and is provided with chamfered corners or other accomodations to facilitate disposition of speaker 202 and start button receptacle 230. Cutouts 234 are preferably formed during the molding process. Alternatively, cutouts could be, if desired, stamped or cut from form 226. Background scene 104 is suitably disposed on the upper surface of form 226 using standard techniques such as, for example, heat transfer.

When assembled, puzzle 100 is substantially rectangular when viewed from the side, as shown in FIGS. 1C and 1D. Upper case 102 has a lower recessed edge 120 which is received in groove 260 of lower case 210, thereby assuring that upper case 102 and lower case 210 are maintained in their proper dispositions in assembly. The total vertical height of puzzle 100 when assembled is sufficiently low to assure the puzzle is not bulky, approximately 0.8 inches in the preferred embodiment.

Puzzle pieces 108 are likewise suitably formed of a rigid material, preferably injection molded from HIPS plastic, conforming in peripheral shape to the corresponding cutout 234. The piece graphics are disposed on the upper surface of pieces 108 by conventional techniques, e.g., heat transfer. If desired, a knob 114 may be disposed on the surface of each puzzle piece 108 to facilitate removal of pieces 108.

As noted above, flexible sheet 228 bears respective graphics 112, each disposed to underlie on associated cutout 234, so that they are exposed when the corresponding puzzle piece 108 is removed. Sheet 228 is suitably formed of a flexible material, such as printable grade PVC or paper, on which graphics 112 are printed, and overcoated with, for example, polypropylene. In assembly, sheet 228 is disposed abutting the under-surface of form 228, and immediately overlying flexible membrane 204.

Figure 4:
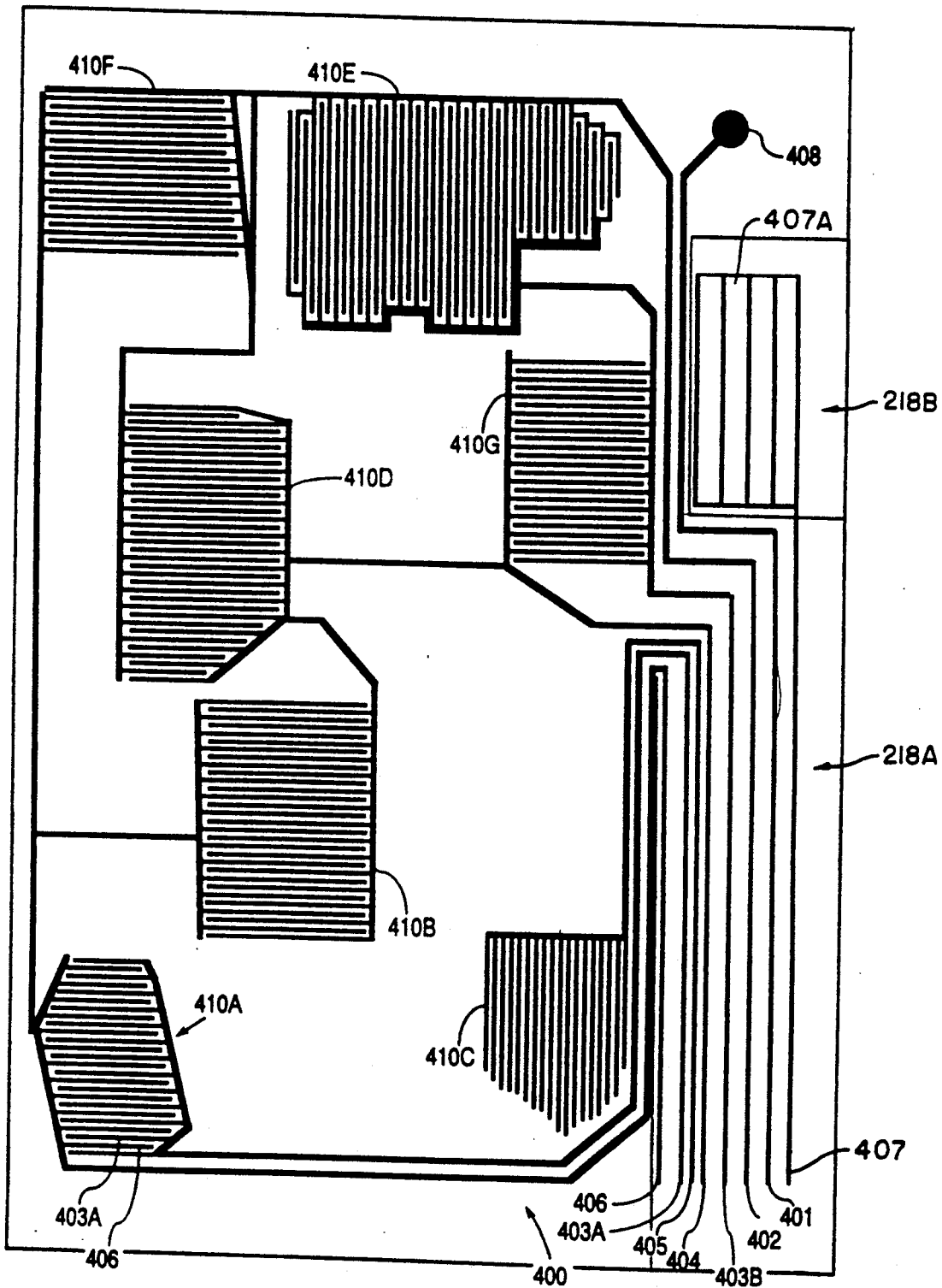
FIG. 4 is a plan view of the underside of the membrane.

Referring now to FIGS. 2A and 4, membrane 204 provides a resilient substrate for a plurality of respective conductors 401–407 (FIG. 4), in predetermined disposition on the underside thereof. Membrane 204 is suitably a polyester sheet with conductors formed of conductive mylar. Conductors 401-406 are disposed to form a respective conductor group aligned with each of graphics 112 and start button 110. More specifically, a conductor 401 is provided to a conductive patch (start point) 408, disposed, in assembly, under start button 110 and above cutout 236D of spacer 206. Conductors 402-406 are disposed to form respective conductor groups 410A, 410B, etc. (collectively referred to as conductor groups 410). Each conductor group 410 is comprised of one or two of conductors 402-406. For example, conductor group 410A is comprised of conductors 403 and 406. Group 410C is formed by multiple fingers extending from conductor 405. Each of conductor groups 410 is disposed above one of cutouts 236 and below one of graphics 112 and one of puzzle pieces 108. A conductor 407, maintained at ground potential, is provided extending into a plurality of fingers 407A for connection to ground plane 208, as will be explained.

Conductors 401-407 extend along a lead 218A for connection to electronic unit 216. Conductors 407A similarly extend along a lead 218B for connection to ground plane 208. Leads 218 suitably comprise partially cut-away portions (strips) along the edge of membrane 204. As shown in FIG. 2A, leads 218A and 218B extend through respective slots 209 and 211 in spacer 206, and with respect to lead 218A, through a corresponding aperture 213 in ground plane 208. Lead 218A is suitably pressed into electrical contact with corresponding conductors on electronic unit 216 by a spring clip 220. Lead 218B is suitably folded under spacer 206. In assembly, spacer 206 presses the conductors thereof into good electrical contact with ground plane 208.

Spacer 206 is suitably formed of a rigid material, such as paper chipboard, with cutouts 236 aligned with each interdigitated conductor group 410 on the lower surface of membrane 204, and thus graphics 112.

Ground plane 208 is preferably comprised of metal foil and is affixed to backboard 252, suitably comprised of a rigid material such as paper chipboard. Ground plane 208 may be affixed to backboard 252 using standard techniques, such as gluing.

As previously noted, membrane 204, spacer 206, and ground plane 208 cooperate to form a touchpad, with a respective touchpoint underlying each graphic 112 and start button 110. When a puzzle piece 108 is removed and at least a predetermined pressure is applied to a particular graphic 112, the conductor group 410 beneath the particular lower graphic 112 is deflected through cutout 236 in spacer 206 and brought into contact with ground plane 208. For example, interdigitated conductor group 410A is disposed beneath graphic 112A, and, together with spacer cutout 236A, form touchpoint 518 (shown schematically in FIG. 5). When the necessary pressure is applied to graphic 112A, membrane 204 is deflected downward such that interdigitated conductors 403 and 406 (group 410A) are deflected through cutout 236A of spacer 206 and brought into electrical contact with ground plane 208, and thus, to ground potential. Conductor groups 410 are designed such that when a touchpoint is depressed, all of the conductors in the group are brought to ground potential essentially simultaneously. Where conductor group 410 includes plural conductors, the respective conductors are spaced sufficienctly close together, e.g., interdigitated, that all conductors touch ground plane 208 essentially simultaneously. Spacer 206 is of sufficient height and the membrane 204 is of sufficient resiliency such that when the pressure is removed from the particular lower graphic 112, the membrane returns to its original position and electrical contact between the conductor group 410 and ground plane 208 is broken. Furthermore, the pressure necessary to effect contact is relatively slight; the typical manner in which a young child touches a graphic 112 with a finger is sufficient to locally deflect membrane 204 to ground plane 208.

Figure 3A:
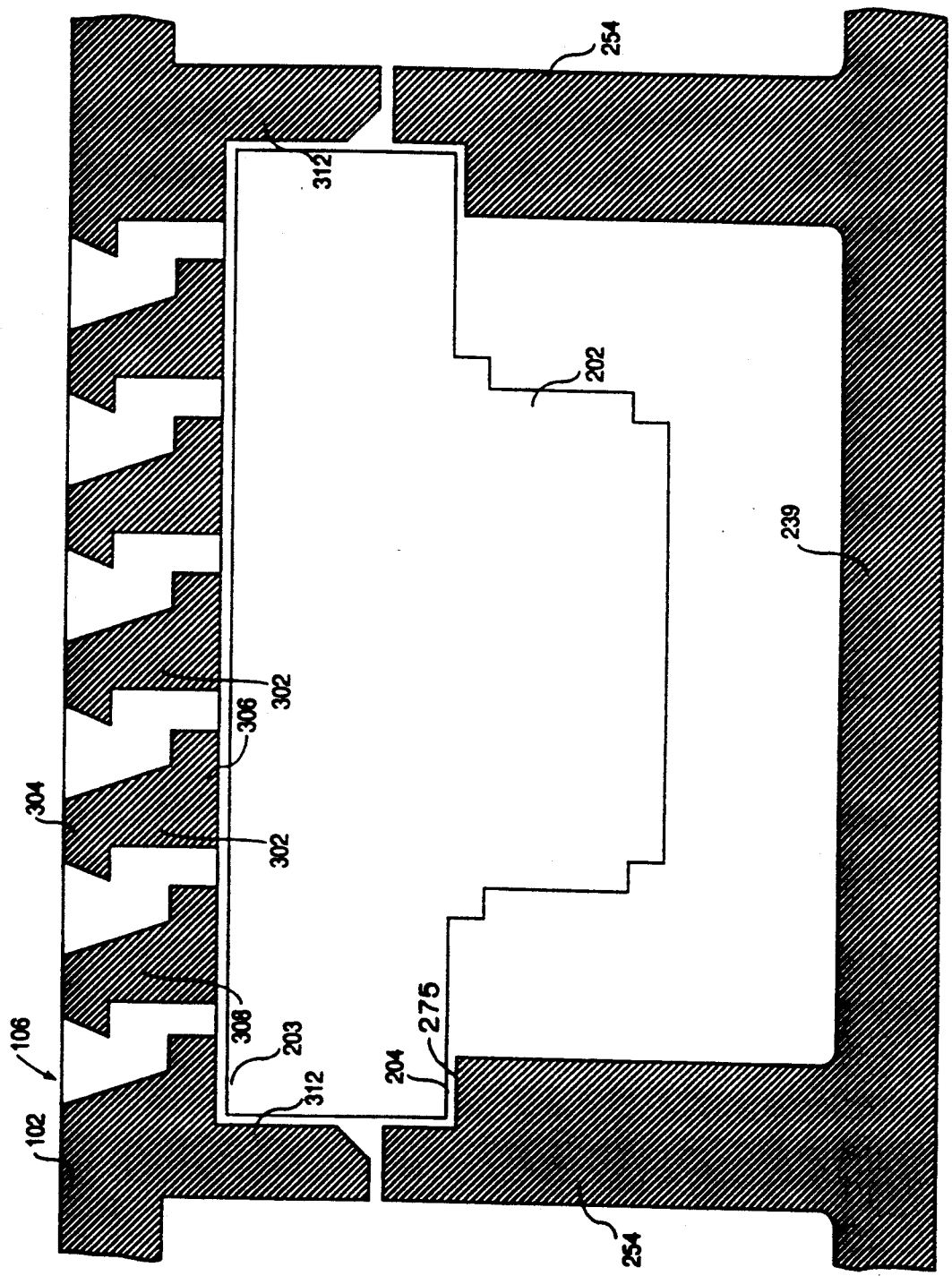
FIG. 3A is an elevational cross section of the preferred exemplary embodiment of the louvred speaker aperture.
Figure 3B:
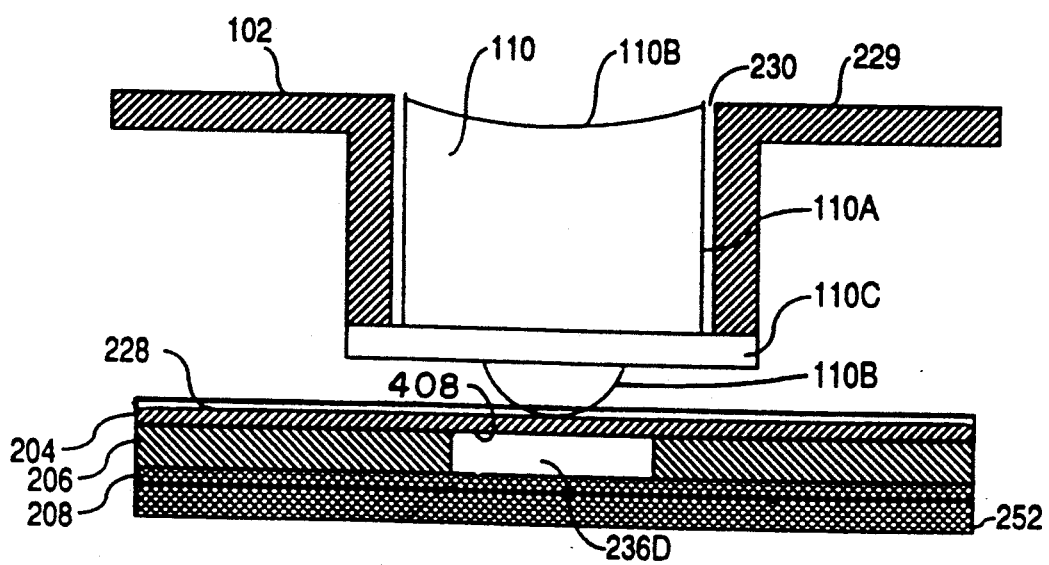
FIG. 3B is an elevational cross section of the start button and receptacle.

Referring to FIG. 3A, speaker grille 106, speaker compartment 254 and speaker 202 (in schematic) are shown. Speaker grille 106, suitably integrally formed in upper case 102, comprises a downwardly projecting cylindrical flange 312 extending circumferentially around and below a plurality of louvres 302. Compartment 254 suitably comprises an annular projection, extending upwardly from bottom 234 of lower case 210. Speaker 202 is received within flange 312, underlying louvres 302. Speaker 202 is supported on a lip 275 about the periphery of the mouth of speaker compartment 254. The inner diameter of flange 312 is of substantially the same diameter as, and provides lateral support for, speaker 202.

Louvres 302 of grille 106 comprise an upper horizontal portion 304, a lower horizontal portion 306 and a vertical connecting portion 308. Upper horizontal portion 304 and vertical connecting portion 308 are substantially trapezoidal and lower horizontal portion 306 is substantially rectangular. Horizontal portions 304 and 306 are horizontally offset such that upper horizontal portion 304 extends to the left of vertical connecting portion 308 and lower horizontal portion 306 extends to the right of vertical connecting portion 308. The spacing between louvres is such that the leftmost extent of the upper portion 304 of a first louvre is directly above the rightmost portion of lower horizontal portion 306 on an adjacent louvre.

In the preferred embodiment the distance between corresponding points on adjacent louvres is 4.1 millimeters; the distance between adjacent louvres along the upper edge is 2.8 millimeters; upper horizontal portion 304 projects 1.3 millimeters to the left from horizontal portion 304; and the height of the louvres 302 is 2.5 millimeters.

The arrangement suitably provides for front loading and baffling of the sound produced by the speaker 202 to provide a high quality sound. The offsetting of horizontal portions 304 and 306 makes it difficult for a child to insert a small object into the speaker.

As best seen in FIG. 3B, start button 110 comprises a cylindrical portion 110A with a concave upper surface 110A, a rounded bottom portion 110B and a peripheral flange 110C. Cylindrical portion 110A is received in receptacle 230 from the underside of upper case 102. Flange 110C is of a diameter larger than that of bore 230 to limit the upward travel of button 110. In assembly, rounded bottom 110B is disposed resting on sheet 228 over conductive patch 408 on membrane 204, and cutout 236D of spacer 206. Button 110 is maintaned in receptacle 230, by flange 110C and upward biasing by membrane 204 against rounded bottom 110B. Rounded bottom 110B projects somewhat beyond flange 110C by an amount generally corresponding to the downward travel necessary to effect electrical contact between the corresponding conductive patch on membrane 204 and ground plane 208.

Figure 5:
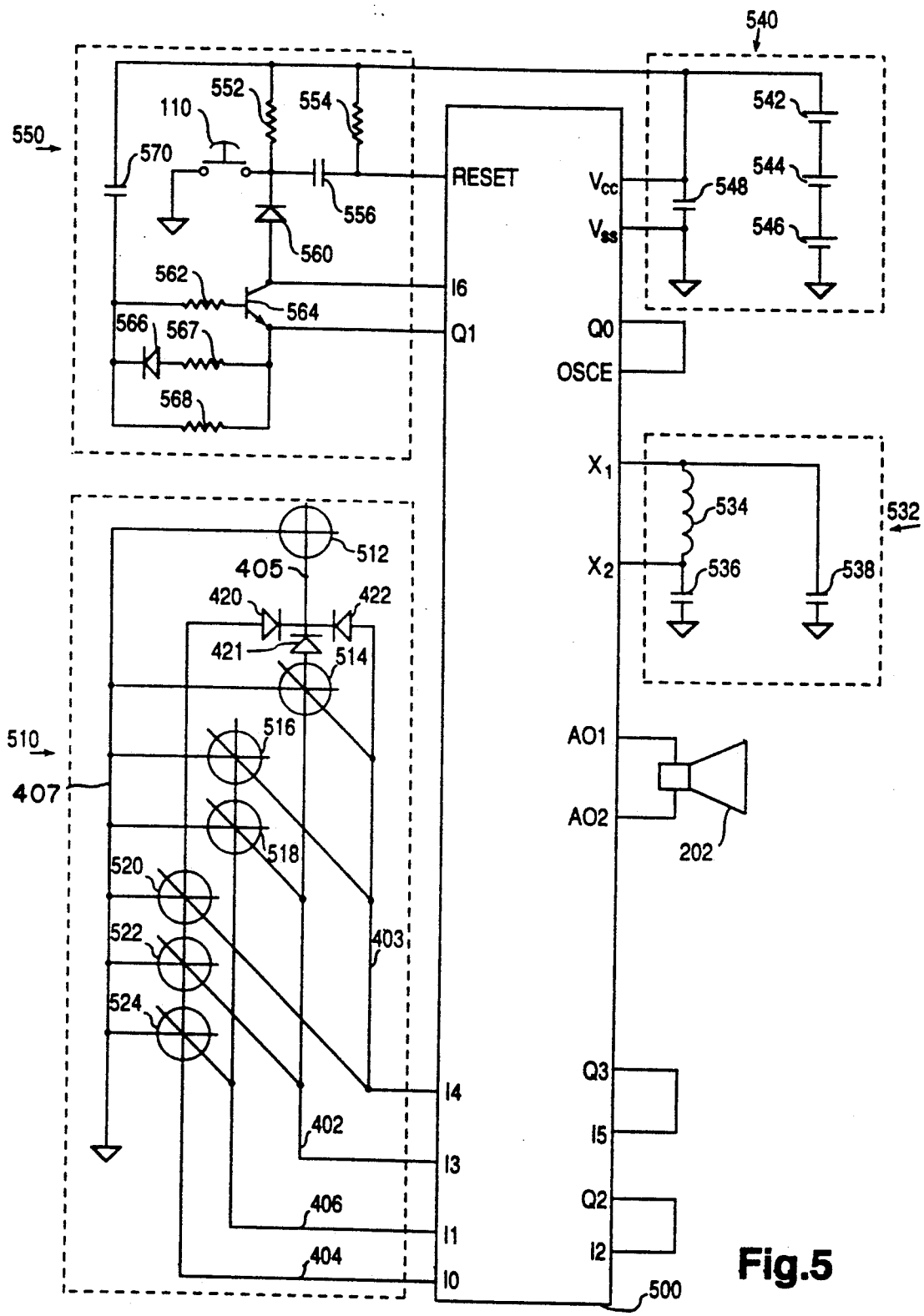
FIG. 5 is a schematic block diagram of the electronic unit.

Referring to FIG. 5, electronic unit 216 is comprised of a digital sound generator 500, an oscillator 532, a power supply 540 and a start circuit 550. The respective switches formed by conductors 401-406 and ground plane 208, together with cooperating electrical components, is generally indicated (schematically) as a touchpoint circuit 510.

Digital sound generator (DSG) 500 suitably comprises an ES3016 digital sound generator, available from Electronic Speech Systems, Inc., of Emeryville, Calif. In general, DSG 500 provides an analog output to external speaker 202 on a pair of outputs A01 and A02 in response to LOW input signals received on a plurality of inputs I0-I6. DSG 500 also includes a plurality of digital control signals Q0-Q8; a RESET input; an oscillator (OSCE) enabling input, and a pair of clock inputs, X1 and X2. DSG 500 will be described more fully in conjunction with FIG. 6.

Touchpoint circuit 510 is comprised of a plurality of touchpoints 512-524, electrical conductors 402, 403, 404 and 406 and diodes 421-422. As described previously, each touchpoint corresponds to a conductor group 410 formed of various combinations of conductors 402, 403, 404 and 406 on the lower surface of membrane 204, in cooperation with spacer 206 and ground plane 204.

When a touchpoint is deflected, the corresponding conductors are connected to ground potential, thereby applying a LOW signal to a preselected combination of inputs I0, I1, I3 and I4. For example, when pressure is applied to graphic 112A (corresponding to touchpoint 516) double interdigitated conductors 403 and 406 of conductor group 410A are deflected through cutout 236A and into contact with ground plane 208. Thus, a low-going pulse is applied to inputs I3 and I1 of DSG 500. DSG 500 responsively provides the appropriate output to speaker 202.

Speaker 202 is electrically connected to analog outputs A01 and A02 of DSG 500. In the preferred exemplary embodiment, speaker 202 has a nominal impedence of at least 32 ohms, such as a CEL-2732- speaker, available from Zeitek of Taiwan. The relatively large nominal impedence aids in the production of high quality sound.

DSG 500 receives power from power supply 540, comprised of a plurality of batteries 542, 544 and 546 and a capacitor 548. In the preferred exemplary embodiment, batteries 542-546 are 1.5 volts each for a total voltage supply of 4.5 volts, and capacitor 548 is a 0.1 microfarad capacitor. DSG 500 includes a clock generator (602 of FIG. 6) which consumes a relatively large amount of power. However, clock generator 602 may be disabled by providing a LOW pulse to DSG 500 OSCE input, thereby greatly conserving power. Clock generator 602 is enabled when a subsequent HIGH signal is received on OSCE input.

Oscillation circuit 532 provides inputs to clock generator 602 on inputs X1 and X2 at a predetermined rate. The pulse rate, determined by the value of an inductor 534 an a pair of capacitors 536 and 538, controls the speed at which DSG 500 operates. In the preferred embodiment, inductor 534 is a 33 microhenry inductor, capacitor 536 is 33 picofarads, and capacitor 538 is 47 picofarads. As is well known in the art the various component values are for exemplary purposes only and may readily be altered to produce different clock inputs.

Start circuit 550 provides for resetting DSG 500 and for a pseudo random selection of the initial prompt. Start circuit 550 is comprised of start button 110, a plurality of resistors 552, 554, 562, 567 and 568, a plurality of capacitors 570 and 556, a plurality of diodes 560 and 566, and a transistor 564.

Depressing start button 110 resets DSG 500, causing a LOW signal to be provided at the RESET terminal. Both sides of capacitor 556 are connected through respective resistors 552 and 554, of substantially equal value to Vcc. Thus, the potential across capacitor 556 is initially zero volts. The reset terminal is coupled to the juncture of capacitor 556 and resistor 554. The juncture of resistor 552 and capacitor 556 is connected to conductor 401 (start button patch 408). Depression of start button 110 thus grounds the juncture of capacitor 556 and resistor 552, permitting capacitor 556 to begin to charge through resistor 554. However, since the voltage across a capacitor cannot change instantaneously, the voltage at the RESET side of capacitor 556 is also lowered to 0 volts. Thus, a LOW signal is provided to RESET on DSG 500, which lasts until capacitor 556 is charged, as determined by the time constant of capacitor 556 and resistor 554. The time constant of capacitor 556 and 554 is preferably chosen to be short enough to insure that the LOW pulse is completed (capacitor 556 charged) before the user releases start button 110. The internal operation of DSG 500 will be explained in detail later, however, upon receiving the LOW pulse at RESET, DSG 500 performs an initialization routine which includes driving Q0 HIGH. Q0 is provided to OSCE, thereby activating clock generator 602.

The pseudo random selection of the initial prompt is accomplished by selecting the prompt according to the length of time start button 110 is depressed. Depressing start button 110 also pulls input I6 LOW through diode 560. DSG 500 repetitively scans through a list of possible responses (one corresponding to each puzzle piece) so long as I6 is held LOW. When start button 110 is released, input I6 is pulled HIGH by an internal pullup resistor in DSG 500, and the scan ceases. An audio prompt, such as "Find and touch the cow", is provided by DSG 500 according to the response at which the scan stopped. Thus, the initial prompt is pseudo random, dependent upon the length of time start button 110 is depressed.

Subsequent audio prompts provided by DSG 500 suitably follow a sequence of 28 prompts, with a return to the beginning of the sequence when the last prompt is given. The sequence includes 4 groups of 7 prompts; each group of 7 prompts is comprised of each possible prompt. However, the order of prompts within each group of 7 prompts is different. Therefore, the order of prompts appears to be random, but avoids the repetition that will occur in a true random sequence. This assures that obvious repetition will not cause a child to tire of the game, and that if a child wants to be prompted to find a particular graphic, the number of prompts preceding the particular prompt corresponding to the graphic is at most the number of graphics, e.g., 7.

Start circuit 550 also aids in power conservation by disabling clock generator 602 when internal control signals indicate a prompt has been given and no response has been received within a predetermined time. Capacitor 570, in cooperation with resistors 562, 567 and 568, diode 566 and transistor 564 act as a timer for DSG 500. Each time DSG 500 provides a prompt, it pulses Q1 HIGH for a short period of time, thereby discharging capacitor 570 through resistor 568 and the combination of diode 566 and resistor 567 (in effect resetting the timer). The pulse provided by DSG 500 at Q1 is of sufficient duration to completely discharge capacitor 570. Therefore, at the end of the HIGH pulse applied at Q1, the voltage across capacitor 570 is 0 volts and the voltage at either side of capacitor 570 is approximately 4.5 volts (the supply voltage).

After each prompt output Q1 returns to LOW, capacitor 570 begins to charge through resistor 568 and the combination of resistor 562 and transistor 564, initiating timing. When capacitor 570 is fully charged, transistor 564 is turned off. Input I6, previously pulled LOW by transistor 564 so long as that transistor was on, is then pulled HIGH by the internal pullup resistor, signaling that the predetermined time has elapsed.

If DSG 500 is waiting for a response and the predetermined time elapses, signaled by I6 going high, output Q0 is provided with a LOW signal, which is applied to OSCE, thereby shutting down clock generator 602. Conversely, if a response is received before the predetermined time elapses, the timer is reset by pulsing Q1 high, thereby discharging capacitor 570.

In the preferred exemplary embodiment, resistors 552, 562 and 568 are suitably 1 megaohm, resistor 554 is suitably 100K ohms, resistor 567 is suitably 1K ohm, capacitor 556 is suitably 0.1 microfarad, capacitor 570 is suitably 100 microfarads, diodes 560 and 566 are suitably IN 4148 diodes, and transistor 564 is suitably a 2N3904 transistor.

Figure 6:
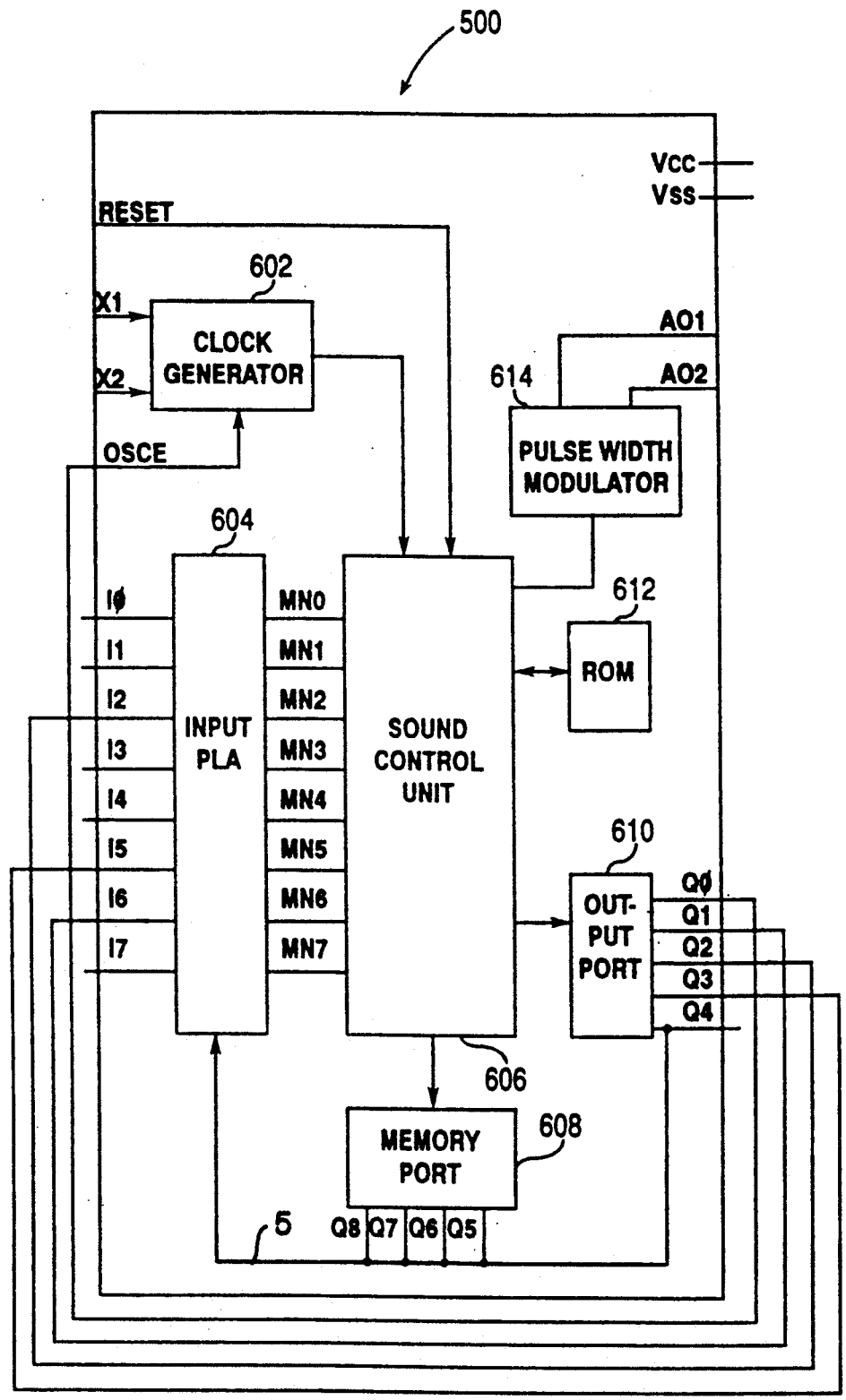
FIG. 6 is a schematic block diagram of the digital sound generator.

Referring to FIG. 6, DSG 500 is suitably comprised of clock generator 602, an input PLA 604, a sound control unit 606, a memory port 608, an output port 610, a ROM 612 and a pulse width modulator 614. In general, DSG 500 provides analog output signals in response to signals received on inputs I0–I7. Input signals received on inputs I0–I7 and control signals Q4–Q8 are provided as inputs to input PLA 604. In response to input signals applied to input PLA 604, an 8-bit digital signal (MN0–MN7) is provided by input PLA 604 to sound control unit 606.

Sound control unit 606 accesses digital data (corresponding to sound) stored in ROM 612 and supplies digital signals corresponding to the accessed sound to pulse width modulator 614. Pulse width modulator 614 receives the digital signal and transmits a corresponding analog signal to outputs A01 and A02 and speaker 530 (shown on FIG. 5). Sound control unit 606 also supplies digital output signals to memory port 608. Memory port 608 in turn provides a internal control signals Q5–Q8 to input PLA 604, which is used in determining the subsequent output. Sound control unit 606 further provides a digital output to output port 610. Output port 610 provides a plurality of digital output signals Q0–Q4.

In the preferred embodiment, control signals Q0–Q3 are externally provided to OSCE, input I2, input I5, and input I6, respectively. Digital control signal Q4 is provided internally to input PLA 604. Inputs I0, I1, I3 and I4 of input PLA 604 are connected to conductor 404, 406, 402 and 403, respectively (FIG. 5). As described earlier, each touchpoint 512-524 corresponds to a unique combination of inputs I0, I1, I3 and I4. For example, touchpoint 512, comprised of a conductor 405, is electrically connected to conductors 403, 402 and 404 through diodes 422, 421 and 420, respectively, as shown on FIG. 5, when depressed provides LOW levels at inputs I0, I3 and I4. Touchpoint 524, on the other hand, when depressed provides LOW levels at I0 and I1. Digital output signals Q2 and Q3 are applied to inputs I2 and I5, and, along with Q4, correspond to the prompt, i.e. a particular animal, provided.

In response to signals applied at PLA inputs I0–I7 and control signals Q5–Q8, PLA 604 generates an 8-bit signal (message number) on lines MN0–MN7 to sound control unit 606. Upon receiving the 8-bit signal, sound control unit 606 accesses data in ROM 612, ignoring any changes on MN0–MN7, and provides the appropriate outputs to pulse width modulator 614 to generate an audio prompt and to memory port 608 to provide control signals to PLA 604, indicative of the state of the play process. At the end of the message, sound control unit 606 waits until the message number applied on MN0–MN7 is changed before playing a new message. Thus, a message will be played once each time the message number is applied to sound control unit 606. Sound control unit 606 ignores lines MN0–MN7 while playing a message, hence the reset must occur after the completion of the message. If it is desirable to repeat a message, MN0–MN7 must be reset to LOW and then the message number reapplied.

As discussed earlier, a sequence of a predetermined number, e.g., 28, prompts (a multiple of the number of puzzle pieces 108), is organized in groups of the number of the number of puzzle pieces, e.g., 7. The respective prompts are designated by the input signals to input PLA 604 (I0–I7, Q4–Q8). More specifically, inputs Q4, I5 and I2, fed back from sound control unit 606 via terminals Q4, Q2, Q1, respectively, of output prot 619 (FIG. 6), provide a 3-bit signal designating a specific one of up to 8 prompts/desired responses (only 7 prompts/desired responses are used in the preferred embodiment). Control signals Q5 and Q6 are fed back from sound control unit 606 to PLA 604 via memory port 608 (internal to DSG 500, FIG. 5) to designate which of the 4 groups of seven prompts is to be accessed.

Control signals Q7 and Q8, similarly fed back from sound control unit 606 to PLA 604, are used to designate the state of the play process; selection of the initial prompt (scanning the list of seven possible prompts for pseudo-random selection); i.e. changing the state of digital feedback signals Q4, Q2 and Q1 providing the prompt corresponding to a selected graphic (puzzle piece); evaluating the response (or lack of response); and accessing the next prompt in the sequence of 28 prompts, i.e. changing the state of digital feedback signals Q6, Q5, Q4, Q2 and Q1. When outputs Q7 and Q8 are both HIGH, the intial prompt is selected according to the state of digital feedback signals Q4, Q2 and Q1 by DSG 500. When output Q8 is HIGH and output Q7 is LOW, PLA 604 provides the prompt selected. When output Q8 is LOW and Q7 is HIGH, PLA 604 waits for and evaluates the response. When outputs Q8 and Q7 are both LOW, PLA 604 selects the next prompt in the 28 prompt sequence according to the state digital feedback signals Q6, Q5, Q4, Q2 and Q1. Thus, the sequence of prompts is controlled, at least in part, by the previous prompt.

Figure 7:
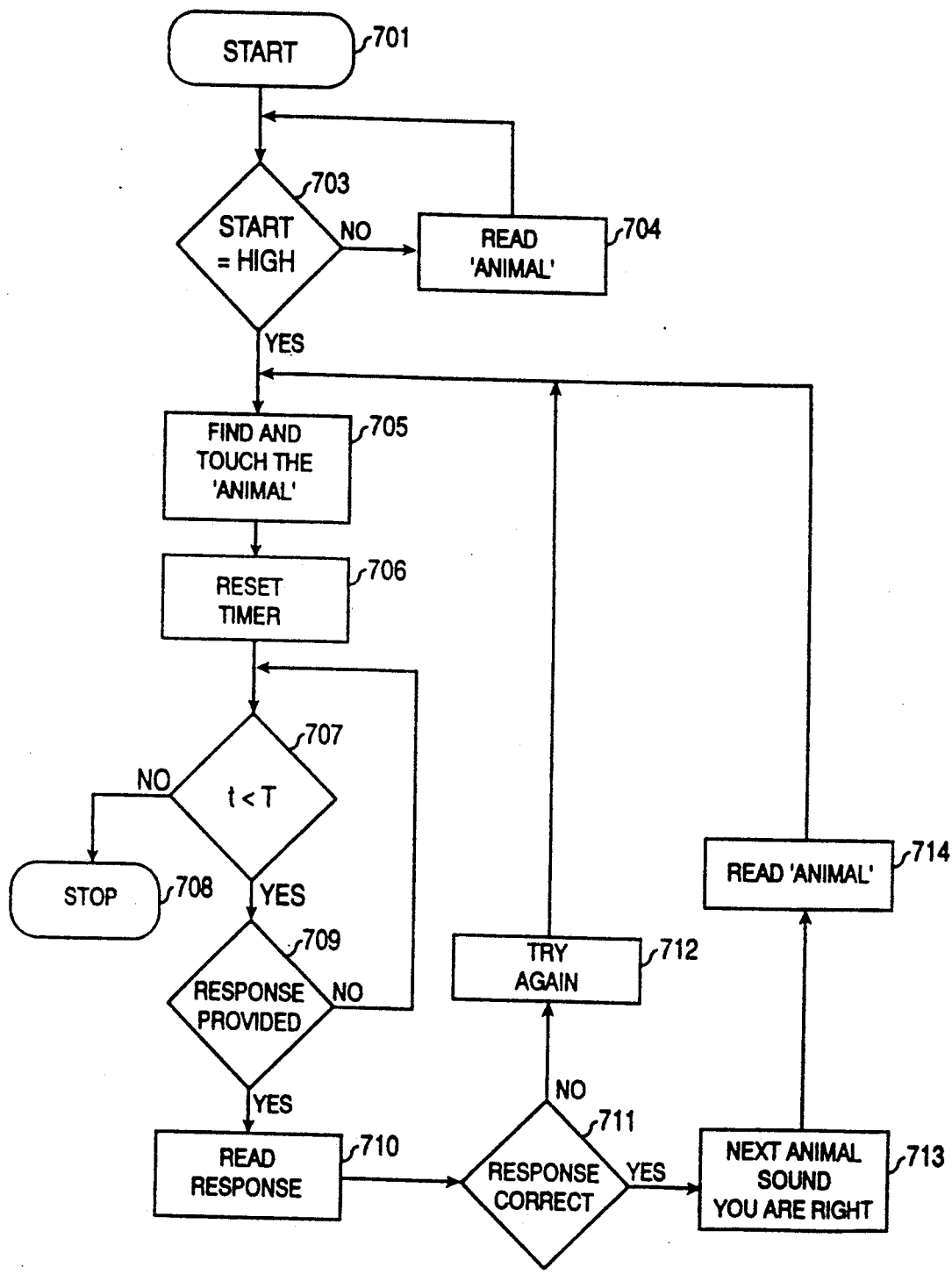
FIG. 7 is a flow chart representing the operation of the digital sound generator.

Referring to FIGS. 5, 6 and 7, the operation of DSG 500 will be described. When the user depresses start button 110 and sends a LOW signal to RESET, an initialization routine is performed. Initialization routine 702 includes driving control signals Q0–Q8 HIGH; this causes PLA 604 to scroll (scan) through the list of 7 prompts (graphics), in accordance with the changing state of digital feedback signals Q4, Q2 and Q1. The scanning continues as long as input I6 is LOW and control signals Q7 and Q8 are HIGH. The state of input I6 is evaluated (step 703). If I6 is LOW, DSG 500 reads the next entry in the list of graphics (step 704).

When input I6 becomes HIGH (i.e., start button 110 was released) and control signals Q7 and Q8 are HIGH, DSG 500 provides the prompt "Find and touch the" and sets control signals Q1 HIGH, Q7 LOW and Q8 HIGH. Control signal Q1 is set HIGH to discharge capacitor 570. Upon receiving low control signal Q7 and HIGH control signal Q8, DSG 500 causes the prompt corresponding to the graphic entry last read (step 704), i.e. the animal designated by digital feedback signals Q4, Q2 and Q2 when I6 become HIGH, to be generated (step 704). The generation of the ,animal, prompt occurs so quickly after the "Find" prompt that they are perceived as a single prompt (Step 705).

After the prompt is generated, control signals Q1 and Q8 are driven LOW and control signal Q7 is driven HIGH. Driving Q1 LOW allows capacitor 570 to begin charging, thus starting the timer (TIMER RESET 706). The elapsed time (t) is then, in effect, compared to a predetermined time T (corresponding to capacitor 560,s charging time) (step 707). If the elapsed time (t) is not less that T, clock generator 602 is turned off (step 708).

If the elapsed time is less than T, control signal Q8 is LOW and control signal Q7 is HIGH, input PLA 604 waits for an input to be provided (step 709). When an input is provided, DSG 500 decodes the response (step 710) and determines if the response is correct (step 711). If the response was incorrect, a prompt stating "Try again" is generated (step 712), and control signal Q8 and Q7 are set HIGH. As discussed above, when Q7 and Q8 are HIGH, PLA 604 gives the prompt "Find and touch the 'animal'" (step 705). Thus, the current composite prompt is identical to the previous prompt.

If the response provided was correct, control signals Q8 and Q7 are set LOW, a sound (related to the graphic), e.g., animal sound, is generated, with music and the words "You are right" (step 713), and the next graphic in the sequence of 28 graphics is read, i.e. the state of digital feedback signals Q6, Q5, Q4, Q2 and Q1 are changed (step 714), and control signals Q8 and Q7 are set HIGH.

As stated above, when control signals Q8 and Q7 are HIGH, the prompt "Find and touch the 'animal', i.e. the prompt designated by Q6, Q5, Q4, Q2 and Q1," is given (step 705). Since a new graphic has been read (step 714), the composite prompt is different than the previous composite prompt.

In summary, DSG 500 provides a prompt, waits for a response, and evaluates the response (or powers down). If a correct response is given, a new prompt is given, but if the response is incorrect, the user is encouraged to try again and the prompt is repeated. The process continues until no response is given, with the order of prompts seemingly random. However, assuming correct responses, a prompt corresponding to each of graphics 112 (and thus puzzle pieces 108) is provided before any repetition occurs.

Thus, it should be apparent that the present invention provides a particularly advantageous interactive audio-visual puzzle. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

We claim:
1. An audio-visual interactive puzzle comprising:
a rigid puzzle form defining an upper surface, including a predetermined number of form cutouts;
an upper graphic disposed on said upper surface of said form;
a plurality of respective removable puzzle pieces, each having a peripheral configuration conforming to that of an associated form cutout and bearing a piece graphic;
a flexible membrane having an underside and bearing, on said underside thereof, a plurality of conductors in predetermined relative disposition;
a plurality of respective lower graphics disposed to overlie said flexible membrane and to underlie said form cutouts;
a spacer including respective spacer cutouts generally corresponding to and disposed to underlie said form cutouts;
a conductive ground plane disposed to underlie said spacer cutouts;
means for maintaining said form, said lower graphics, said flexible membrane, said spacer and said ground plane in predetermined relative dispositions; and
an electronic sound generator, responsive to input signals applied thereto, for generating respective predetermined associated sounds in response to the input signals;
said flexible membrane conductors, said spacer and said ground plane corresponding to form a touchpad including a touchpoint corresponding to each of said lower graphics electrically connected to said electronic sound generator, to selectively effect generation of said the input signals to said electronic sound generator.

2. The audio-visual interactive puzzle of claim 1, wherein said lower graphics are disposed on a flexible sheet underlying said frame.

3. The audio-visual interactive puzzle of claim 1, further comprising a start button and wherein:
said spacer includes a spacer cutout generally corresponding to and disposed to underlie said start button; and
a touchpad includes a touchpoint corresponding to said start button to selectively effect generation of an input signal to said electronic sound generator.

4. The audio-visual interactive puzzle of claim 1, further comprising means for generating audible prompts indicative of individual ones of said puzzle pieces.

5. The audio-visual interactive puzzle of claim 1, wherein the subject matter of said piece graphic is logically related as a clue to the subject matter of said upper graphic.

6. The audio-visual interactive puzzle of claim 1, wherein the subject matter of said upper graphic, piece graphic and lower graphic are logically related as a clue.

7. An audio-visual interactive learning aid comprising:
a rigid puzzle form defining an upper surface, including a predetermined number of form cutouts;
an upper graphic disposed on said upper surface of said form;
a plurality of respective removable puzzle pieces, each having a peripheral configuration conforming to that of an associated form cutout and bearing a piece graphic;

a flexible membrane having an underside and bearing, on said underside thereof, a plurality of conductors in predetermined relative disposition;

a plurality of respective lower graphic disposed to overlie said flexible membrane and to underlie said form cutouts;

a spacer including respective spacer cutouts generally corresponding to and disposed to underlie said form cutouts;

a conductive ground plane disposed to underlie said spacer cutouts;

said flexible membrane conductors, said spacer and said ground plane cooperating to form a touchpad including a touchpoint corresponding to each of said lower graphics, actuation of one of said touchpoints selectively effecting generation of a response signal indicative of the corresponding lower graphic;

means for generating audible prompts indicative of a respective designated one of said lower graphics, and, responsive to a subsequent response signal, generating respective predetermined sounds associated with the corresponding lower graphic if said response signal is indicative of said designated lower graphic.

8. The learning aid of claim 7, further including means for, responsive to a response signal indicative of a lower graphic other than said designated lower graphic, selectively generating a further audible prompt indicative of a said same designated lower graphic, and, responsive to a response signal indicative of said designated lower graphic, selectively generating a further audible prompt indicative of a new designated lower graphic.

* * * * *